United States Patent
Sun et al.

(10) Patent No.: US 7,046,523 B2
(45) Date of Patent: May 16, 2006

(54) CORE STRUCTURE AND INTERLEAVED DC—DC CONVERTER TOPOLOGY

(75) Inventors: Jian Sun, Clifton Park, NY (US); Xiukuan Jing, Camarillo, CA (US); Sriram Chandrasekaran, Burbank, CA (US); Vivek Mehrotra, Newbury Park, CA (US)

(73) Assignee: ColdWatt, Inc., Austin, TX (US)

( * ) Notice: Subject to any disclaimer, the term of this patent is extended or adjusted under 35 U.S.C. 154(b) by 565 days.

(21) Appl. No.: 10/302,095

(22) Filed: Nov. 21, 2002

(65) Prior Publication Data

US 2003/0198067 A1    Oct. 23, 2003

Related U.S. Application Data

(63) Continuation-in-part of application No. 10/126,477, filed on Apr. 18, 2002, now Pat. No. 6,873,237.

(51) Int. Cl.
  *H02M 3/335* (2006.01)
  *H02M 7/5387* (2006.01)
  *H02M 5/42* (2006.01)

(52) U.S. Cl. ..................................... 363/17; 363/132

(58) Field of Classification Search ................ 363/16, 363/17, 56.01, 56.02, 97, 98, 131, 132, 84, 363/89, 125, 127
  See application file for complete search history.

(56) References Cited

U.S. PATENT DOCUMENTS

| | | | |
|---|---|---|---|
| 4,823,249 A * | 4/1989 | Garcia, II | 363/48 |
| 4,899,271 A | 2/1990 | Seiersen | 363/126 |
| 5,132,888 A | 7/1992 | Lo et al. | 363/17 |
| 5,291,382 A | 3/1994 | Cohen | 363/16 |
| 5,305,191 A * | 4/1994 | Loftus, Jr. | 363/17 |
| 5,335,163 A | 8/1994 | Seiersen | 363/126 |
| 5,508,903 A | 4/1996 | Alexndrov | 363/16 |
| 5,555,494 A | 9/1996 | Morris | 363/17 |
| 5,784,266 A | 7/1998 | Chen | 363/16 |
| 6,215,290 B1 | 4/2001 | Yang et al. | 323/282 |

(Continued)

OTHER PUBLICATIONS

"A High Power Density, High Efficiency and Fast Transient Voltage Regulator Module With a Novel Current Sensing and Current Sharing Techniques", Zhou et al., IEEE Applied Power Electronics Conference, Mar. 1999, p. 289-294.

(Continued)

*Primary Examiner*—Matthew V. Nguyen
(74) *Attorney, Agent, or Firm*—Slater & Matsil, L.L.P.

(57) ABSTRACT

There is disclosed a core structure with a very low profile, high power density and lower losses. The disclosed design allows for a larger core area where the DC fluxes are added, thereby reducing the air-gap requirements in the cores derived from low saturation density materials such as ferrites. The cellular nature of the design can be effectively employed in vertically packaged power converters and modules. Also disclosed is a DC-DC converter topology which preferably employs the disclosed core. N AC drive voltages drive N current doubler rectifiers (CDRs) in accordance with the symmetric modulation scheme; each CDR provides two rectified output currents to an output node. Each AC drive voltage has a switching period $T_s$. The drive voltages are phase-shifted by $T_s/(2*N)$, such that the rectified output currents of the CDRs are interleaved, thereby reducing output voltage ripple.

21 Claims, 15 Drawing Sheets

U.S. PATENT DOCUMENTS 6,683,797 B1 * 1/2004 Zaitsu et al. .................. 363/16
6,765,810 B1 * 7/2004 Perry ....................... 363/21.06

OTHER PUBLICATIONS

"Investigation of Candidate VRM Topologies for Future Microprocessors", Zhou et al., IEEE Applied Power Electronics Conference Mar. 1998, p. 145-150.

"A Novel Integrated Current Doubler Rectifier", Xu et al., IEEE Applied Power Electronics Conference, Mar. 2000, p. 735-740.

A Family of Novel Interleaved DC/DC Converters for Low-Voltage High-Current Voltage Retgulator Module Applications, Xu et al., IEEE Power Electronics Specialists Conference, Jun. 2001, p. 1507-1511.

* cited by examiner

PT$_{11}$

CORE STRUCTURE AND INTERLEAVED DC—DC CONVERTER TOPOLOGY

CROSS-REFERENCE TO RELATED APPLICATIONS

This application is a continuation-in-part of application Ser. No. 10/126,477, filed Apr. 18, 2002 now U.S. Pat. No. 6,873,237.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

GOVERNMENT INTERESTS

The United States Government has rights in this invention pursuant to Contract No. 48803-8101 (RC) and 44104-8901 (Govt.) between the United States Department of Defense, Office of Naval Research and Rockwell Scientific Co.

BACKGROUND OF THE INVENTION

1. Field of the Invention

This invention relates to the field of DC-DC converters, and particularly to core structures and converter topologies which achieve small output voltage ripple.

2. Description of the Related Art

Power converters are key components in many military and commercial systems and they often govern size and performance. Power density, efficiency and reliability are key characteristics used to evaluate the characteristics of power converters. Transformers and inductors used within these power converters may be large and bulky and often limit their efficiency, power density and reliability.

The electromagnetic theory of operation of inductors and transformers is well known. The general concepts for combining magnetic functions of inductors and transformers on a single magnetic core structure are also well known. Integrated transformer/inductor devices typically take advantage of a transformer's magnetizing inductance to combine the function of a transformer and the function of an inductor connected in parallel with the transformer's secondary winding on a single core structure. One type of well-known core is the E-core. An E-core has a cross-section that looks like the capital letter "E." An E-core is typically disposed on its side, with the long part of the E at the bottom, forming a base. E-cores are commonly used in current doubler circuits.

E-cores typically have one of two configurations—the EI-core or the EE-core. In the EI-core, a flat plate, the "I," is disposed on top of the basic E-core. In the EE-core, two Es are put together, with the legs of the Es facing each other. The EI-core, the EE-core and other cores incorporating the E core structure are referred to generically as E-cores.

E-cores are typically used for transformers and inductors, and a single E-core may be adapted for use as both a transformer and an inductor. In one typical design, both of the outer legs have a primary and a secondary winding. Voltage to the windings is typically switched so that only one outer leg at any given time is acting as a transformer. The device is said to have one or two switching periods during which the inductors charge, and a freewheeling period during which the inductors discharge. In devices having two switching phases, the circuitry provides for one outer leg to act as an inductor while the other outer leg is acting as a transformer. Because of their dual but time-separated nature, the outer legs are said to have a transformer phase and an inductor phase. E-cores can be isolated (without transformers) or non-isolated (with transformers). E-cores may also be used only as transformers.

When an outer leg of an E-core is acting as an inductor, magnetic flux is stored in the core. Magnetic flux flows through the outer leg which is acting as an inductor, through the top, the base, and through the center leg of the E. To provide increased energy storage, there is typically an air gap between the center leg and the top. Because of the air gap, the center leg is therefore typically shorter than the outer legs. Inductance in an E-core is primarily determined by the area of the center leg. To obtain higher inductance, the area of the center leg is increased.

One limitation on the area of the center leg is fringing flux. Like bright light from one room leaking under a door into a dark second room, flux from the air gap can spill onto the outer legs. Fringing flux causes current losses in the transformer of the other outer leg. One way to accommodate fringing flux is to place the windings on the outer legs a safe distance from the air gap. To do this, the outer legs may be far from the center leg, or the outer legs may be longer so that the windings may be positioned closer to the base and far enough from the air gap. These two solutions result in either a wider E-core or a taller E-core, both of which can be burdens on mechanical designs. Another way to reduce fringing is to increase the area of the air gap. Fringing varies inversely with the area of the air gap.

Another problem with most E-cores arises from their inefficiency. In general, the energy losses come in the form of heat. This generated heat can become a significant problem, requiring cooling through fans, air flow and other means. The additional power and cooling needs create additional burdens on electronic and mechanical designs.

Such cores are often used to provide a DC-DC converter. A DC voltage is first converted to one or more AC drive voltages that toggle at a particular switching frequency. The AC drive voltages are applied to the primary windings of one or more magnetic cores, inducing currents in the secondary windings which are rectified to provide a DC output voltage. This type of converter can provide a high output current with very high efficiency.

However, the output voltage ripple inherent in such converters can be excessive, particularly when a low (<2 V) supply voltage is needed. Output ripple can be reduced by increasing switching frequency, but this can result in unacceptable switching losses. Another way to reduce output ripple is with the use of a large output capacitor. However, the space allotted for a converter's output capacitor is often very limited, and thus the use of a larger capacitor is impractical.

SUMMARY OF THE INVENTION

A magnetic core structure and converter topology are presented which overcome the problems noted above, providing high currents with less output ripple, without the need for a large output capacitor.

The new converter topology converts a DC voltage to N AC drive voltages suitable for driving N interleaved, half-bridge, isolated current doubler rectifiers (CDRs) in accordance with the symmetric modulation scheme. Each CDR is driven with a respective AC drive voltage and is arranged to provide two rectified output currents to an output node; each AC drive voltage has a switching period $T_s$. The AC drive voltages are phase-shifted by $T_s/(2*N)$, such that the rectified output currents of the N CDRs are interleaved.

Each CDR preferably comprises first and second primary windings connected in series, and first and second secondary windings which are connected together at the output node, with the first and second secondary windings magnetically coupled to the first and second primary windings, respectively. The primary and secondary windings are preferably wound on a common core—preferably the novel core described herein. The AC drive voltages are applied across the series-connected first and second primary windings. A preferred embodiment comprises 2 CDRs arranged to produce four interleaved currents using phase-shifted AC drive voltages as described above. When so arranged, the output voltage ripple of the converter is significantly reduced, such that, when compared with prior art designs, the size, cost, RMS loss and capacitance of the output filter can be much smaller for a given ripple requirement.

Further features and advantages of the invention will be apparent to those skilled in the art from the following detailed description, taken together with the accompanying drawings.

DETAILED DESCRIPTION OF THE INVENTION

Throughout this description, the embodiments and examples shown should be considered as exemplars, rather than limitations on the apparatus and methods of the present invention.

A core in accordance with the invention is useful in power modules and power converters. These power modules and power converters are well suited for low voltage, high current DC-DC converter applications. A core in accordance with the invention may have ultra-low profile magnetics, resulting in better utilization, higher inductance, improved efficiency and lower temperature. In typical E-cores, increased compactness results in decreased efficiency. In contrast, in a core of the invention, increased compactness may result in increased efficiency. Improved efficiency is an unexpected benefit of the invention.

Figure 1:
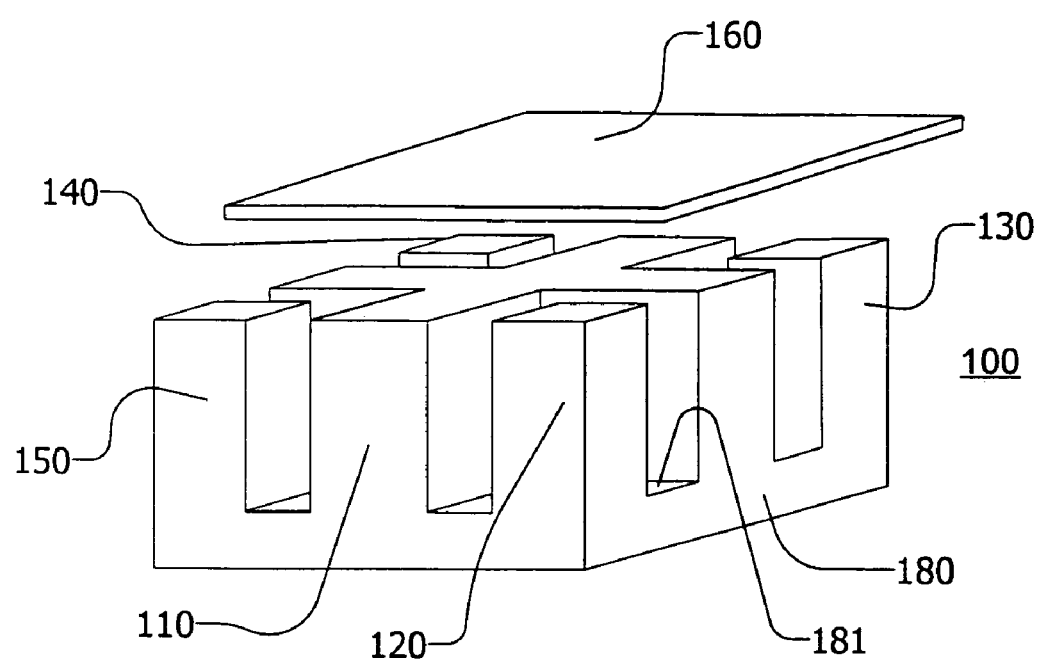
FIG. 1 is an exploded side elevated view of a core having a rectangular design in accordance with the invention.
Figure 2:
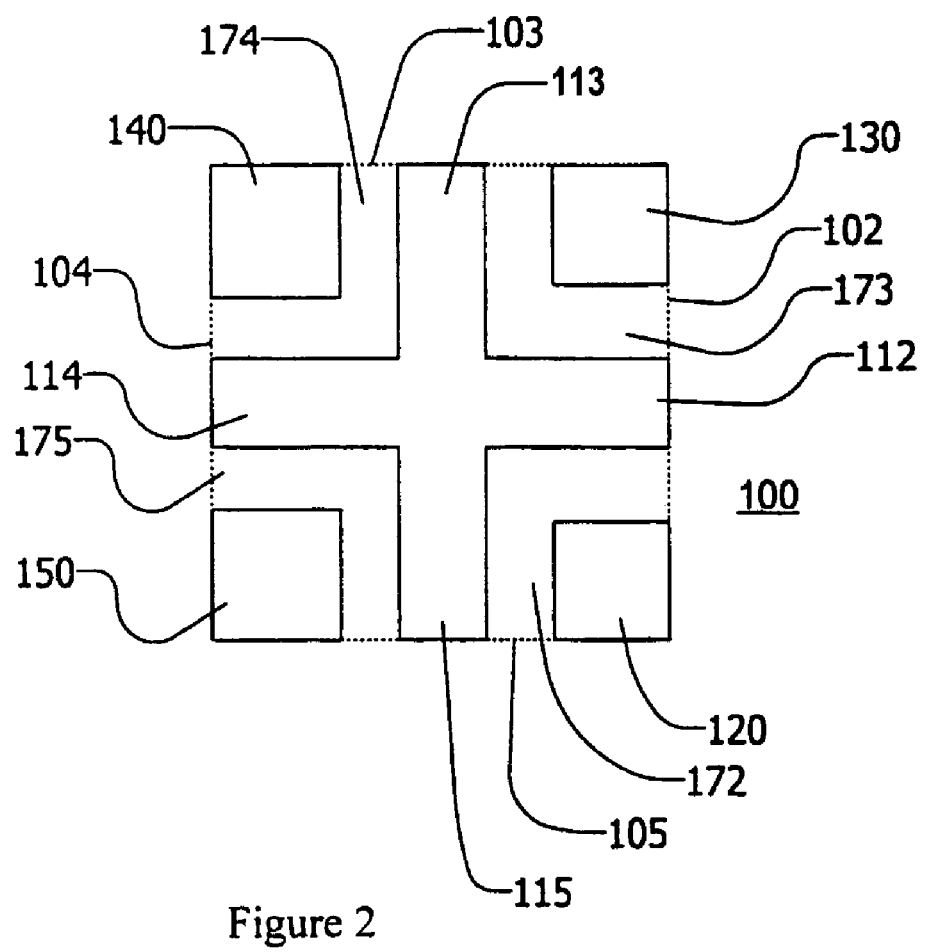
FIG. 2 is a top view of the core of FIG. 1.

Principals of the invention are described below with respect to a half-bridge current doubler rectifier application. The invention is, however, applicable to a wide variety of DC-DC converter topologies and control algorithms. The core of the invention may also be useful in other types of power converters and modules, such as AC-AC and AC-DC. The cellular structure also enables the use of interleaving with multi-phase DC-DC converters to further reduce the current and voltage ripple and higher integration levels for multiple output DC-DC converters with integrated magnetics Referring now to FIGS. 1 and 2, there are shown two views of a core 100 having a square design in accordance with the invention. The core 100 comprises a base 180, a center portion 110, plural posts 120, 130, 140, 150 and a top 160. The base 180, the posts 120, 130, 140, 150 and the center portion 110 may be produced as an integrated unit. Alternatively, some or all of these parts 100, 110, 120, 130, 140, 150 may be produced separately and joined. The core 100 may be formed of a single material. Alternatively, the materials of the separate components may be different and varied. The materials may be magnetic, such as ferrite, 3F3, powdered iron, nickel-iron alloys, or non-magnetic, or composite.

Whereas the base of a typical E-core has a linear shape, the base 180 of core 100 has a square shape, with the four posts 120, 130, 140, 150 disposed at the four corners of the square. The posts 120, 130, 140, 150 are disposed on a top region 181 of the base 180. Post 120 is disposed at the intersection of outer edges 102 and 105. Post 130 is disposed at the intersection of outer edges 102 and 103. Post 140 is disposed at the intersection of outer edges 103 and 104. Post 150 is disposed at the intersection of outer edges 104 and 105. The base 180 is planar and the top region 181 is flat where exposed, though these configurations are not required.

The center portion 110 is also disposed on the top region 181 of the base 180. The center portion 110 includes legs 112, 113, 114, 115 which are between the posts 120, 130, 140, 150. Leg 112 is disposed between posts 120 and 130. Leg 113 is disposed between posts 130 and 140. Leg 114 is disposed between posts 140 and 150. Leg 115 is disposed between posts 150 and 120. The legs 112, 113, 114, 115 provide separation between the posts 120, 130, 140, 150. In the square-shaped core 100 of FIGS. 1 and 2, the center portion 110 has a plus shape.

The legs 112, 113, 114, 115 and the posts 120, 130, 140, 150 also define respective windows. There is a window 172 between post 120 and center legs 112, 115. There is a window 173 between post 130 and center legs 112, 113. There is a window 174 between post 140 and center legs 113, 114. There is a window 175 between post 150 and center legs 114, 115.

The top 160 of core 100 comprises a flat plate, similar to the top plate of an EI-core. However, a top in accordance with the invention need not be flat or plate-like, may be similar to that of an EE-core, and its shape may be adapted for the desired characteristics of the core.

Figure 3:
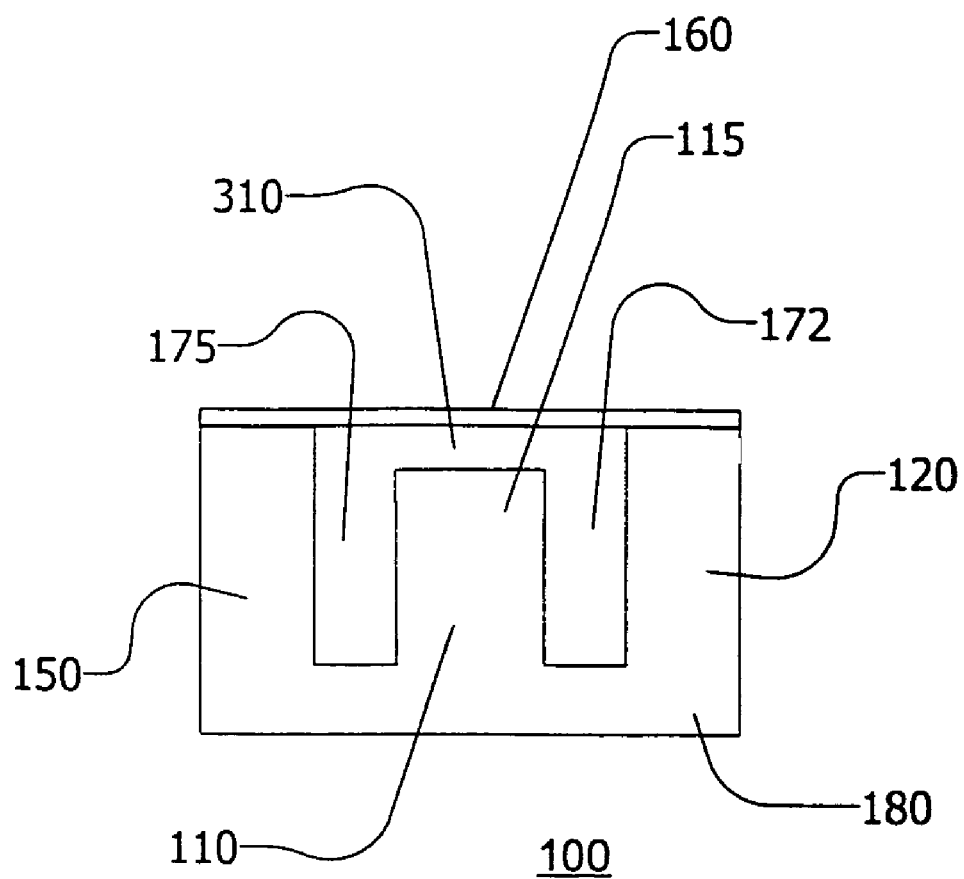
FIG. 3 is a side view of the core of FIG. 1.

Referring now to FIG. 3, there is shown a side view of the core 100. In this view, the core 100 looks like a typical E-core. In this view, an air gap 310 is apparent. The air gap 310 is defined by the top 160 and the center portion 110. The height of leg 115 is exaggerated in this view to make the air gap 310 larger and therefore more apparent. The air gap 310 extends the entire space between the center portion 110 and the top 160—above all of the legs 112, 113, 114, 115.

The view of FIG. 3 demonstrates the cellular nature of a core of the present invention. As used herein, a "cell" comprises two posts, the base and the center portion. Although two posts in part define a cell, windings on these posts and their electrical connections provide further definition of a cell. The number of primary and secondary windings on a given post is selected based in part upon the number of cells which are desired to share the post.

The core 100 may be used in a four cell structure. The combination of the two posts 120, 150 with the center portion 110 and the base 180 may be used in one cell of the core 100. The view taken from any of the four sides 102, 103, 104, 105 of the core 100 has the same appearance. Thus, the four cells of core 100 may be comprised of the center portion 110, the base 180 and any two adjacent posts: post 120+post 150, post 120+post 130, post 130+post 140, or post 140+post 150. Whether such a combination is a cell, however, depends on the windings on each post.

One of the benefits of the core of the present invention is the presence of a shorter air gap than would be found in a comparable typical E-core or collection of E-cores. Whereas a typical E-core has a center leg between the two outer legs, the core of the invention has a center portion which may be considerably larger in comparison. The larger center portion may result in a shorter air gap. The shorter air gap has reduced fringing flux, meaning that the core may be more compact. In use, a power converter or power module of the invention should be considerably more efficient than a collection of E-cores providing comparable outputs. Thus, power consumption is reduced, heat losses are reduced, cooling requirements are reduced, and overall size requirements are reduced.

Figure 4A:
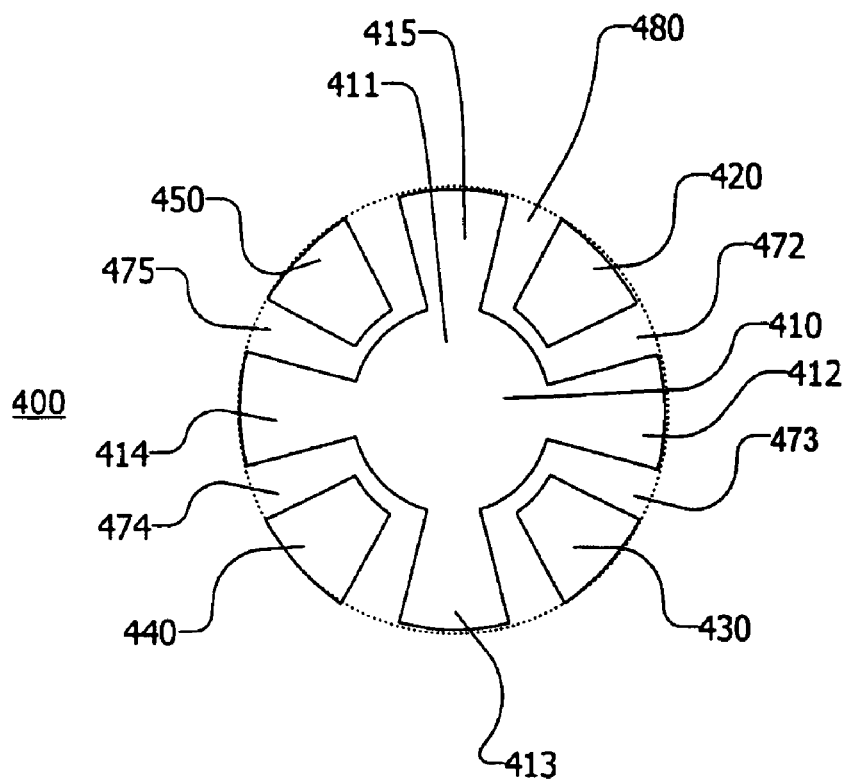
FIG. 4A is a top view of a core having a radial design in accordance with the invention.

Referring now to FIG. 4A, there is shown a top view of a core 400 having a radial design in accordance with the invention. The radial core 400 is similar to the rectangular core 100 of FIG. 1. The core 400 includes a base 480, center portion 410, posts 420, 430, 440, 450 and windows 472, 473, 474, 475. The base 480 is round and the posts 420, 430, 440, 450 are disposed on its perimeter. The center portion 410 has a round central portion 411. Legs 412, 413, 414, 415 radiate from the central portion 411.

Figure 4B:
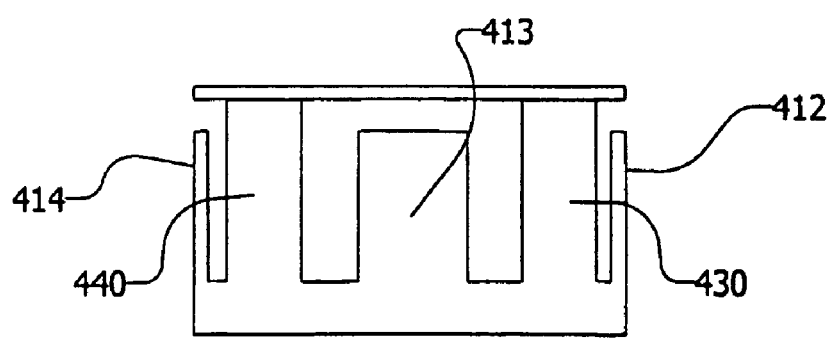
FIG. 4B is a side view of the core of FIG. 4A.

The core 400 has a cellular structure. Referring now to FIG. 4B, there is shown a side view of the core 400. From the side, the core 400 has substantially the same appearance as the rectangular core 100 shown in FIG. 3. In FIG. 4B, the visible cell comprises posts 430, 440, the center portion 410 and the base 480. The core 400 has three more cells, also comprised of the center portion 410, the base 480, and: post 420+post 430, post 440+post 450, and post 420+post 450.

The desired transformer and inductor behavior, as well as cost and mechanical constraints, determine dimensions of the core, posts, legs, windows and air gap. Although the cores 100, 400 are symmetric, a core of the invention may be asymmetric. There may be variations amongst the posts, legs, windows and air gap in their sizes, shapes and placement on the base. The solid geometries of the posts, legs, center portion and base may also be varied. The number of windings on each post may be varied.

Although some center portion must be included in a core, the legs may be omitted. The legs improve performance of the power conducting device by giving a shorter or more direct path to the center area. The legs also contribute to the larger area of the center portion and the larger area of the air gap.

Because of the large center portion of a core of the invention, very high inductance can be obtained from a smaller device. The size and shape of the center portion may be determined from the maximum flux density of the material and the total load current. How far the legs extend to, along side and past the posts may be determined from many factors, including performance, cost, and ease of manufacturing.

Figure 5A:
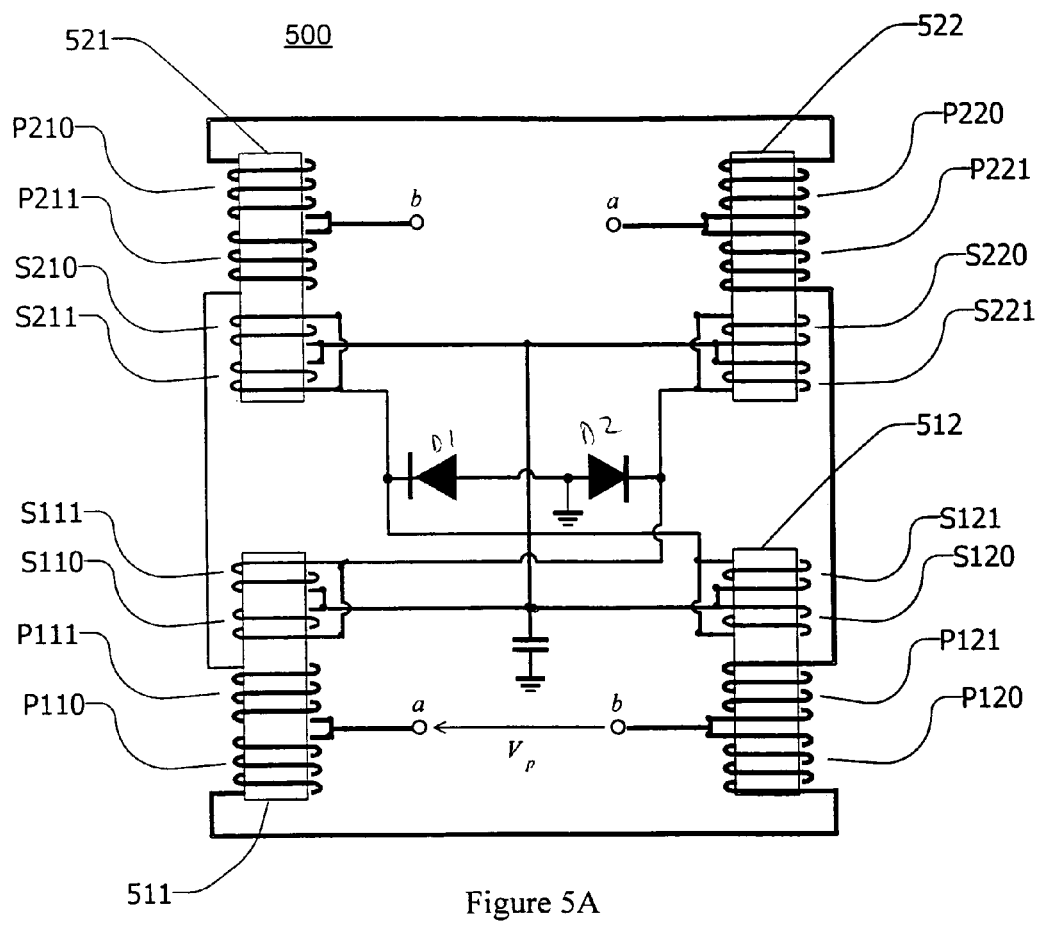
FIG. 5A is a diagram showing a winding arrangement and some electrical components for a power converting apparatus in accordance with the invention.

FIG. 5A is a diagram showing a winding arrangement, wiring and some components for a four cell power converting apparatus 500 in accordance with the invention. A center portion is not shown in FIG. 5. The winding arrangement of FIG. 5A is compatible with both the rectangular core 100 of FIG. 1 and the radial core 400 of FIG. 4. The power converting apparatus 500 includes posts 511, 512, 521, 522. The posts 511, 512, 521, 522 have respective primary windings P110, P111, P120, P121, P210, P211, P220, P221 and secondary windings S110, S111, S120, S121, S210, S211, S220, S221. The windings may be, for example, copper, aluminum, gold or silver wire, or formed from alloys, ceramics or other electrically conductive materials. In most embodiments, the winding directions will be chosen so that the magnetic fluxes generated in the posts are additive in the center portion. However, it may also be desirable to have one or more posts generate subtractive flux.

In the four cell core 500 of FIG. 5, the posts 511, 512, 521, 522 each have two primary windings and two secondary windings. For example, a cell comprising posts 511 and 512 includes primary windings P110 and P120. The other cells include, respectively, posts 521, 522 and windings P210, P220, posts 511, 521 and windings P111, P211, and posts 512, 522 and windings P121, P221. When the primary voltage is of a given polarity, the secondary windings on diagonally opposite posts (e.g., 511 and 522, and 521 and 512) share the load current. The energy due to the primary current in the posts in their inductor phase is stored in the air gap of the center portion. Thus, the load current is divided into four parallel paths when the power is transferred across the transformer core and into eight parallel paths during the freewheeling period.

Figure 5B:
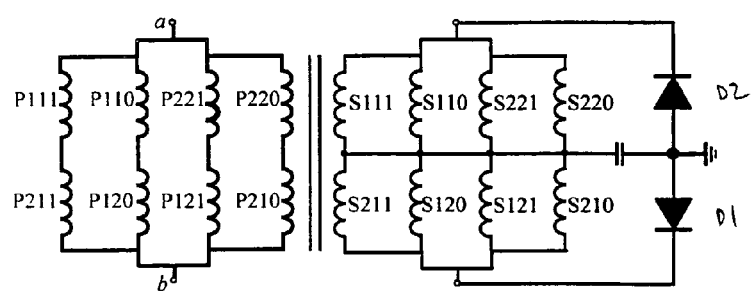
FIG. 5B is a circuit diagram corresponding to FIG. 5A.

Referring now to FIG. 5B, there is shown a circuit diagram corresponding to the diagram of FIG. 5A. A typical E-core is used in a current doubler circuit. The circuit of FIG. 5B is a current quadrupler.

Figure 6:
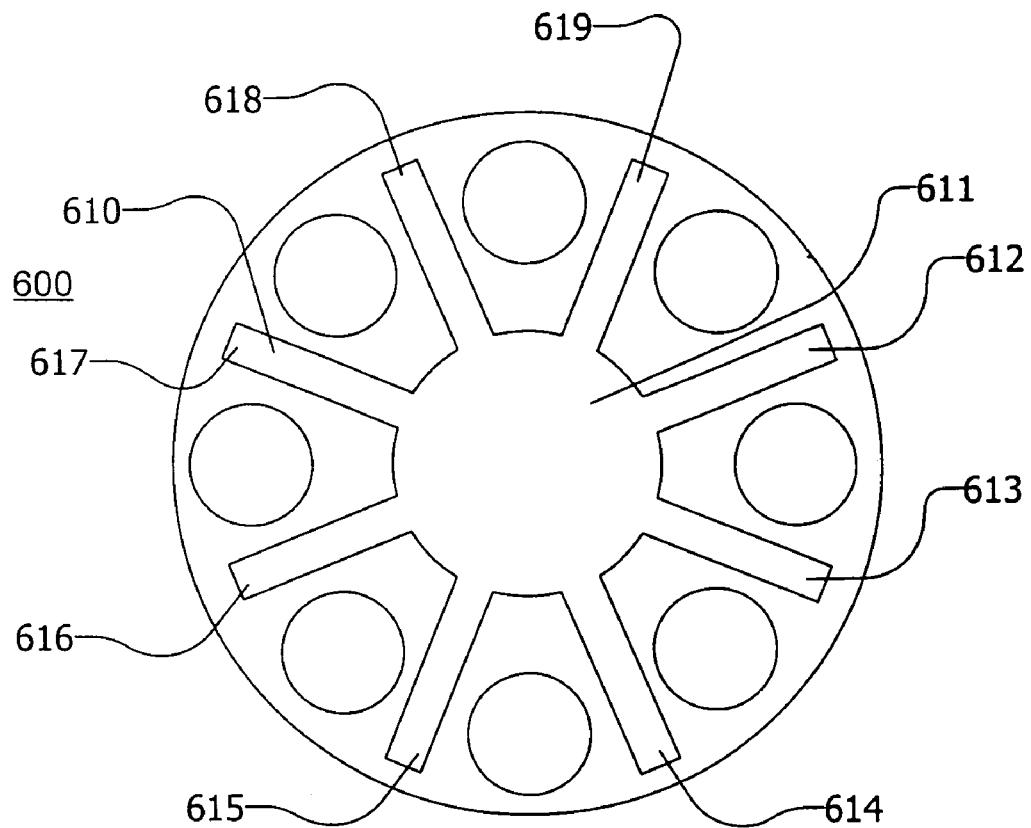
FIG. 6 is a top view of a core having a radial design in accordance with the invention.

FIG. 6 shows a diagram of another core 600 having a radial design. Center portion 610 has a round center 611 and radial legs 612, 613, 614, 615, 616, 617, 618, 619. The eight cell structure of core 600 may be derived from the four cell structure of FIG. 3 by adding additional sectors (posts, legs and windows). Like the radial four cell structure, the radial eight cell structure has two primary windings and two secondary windings on each post.

Figure 7:
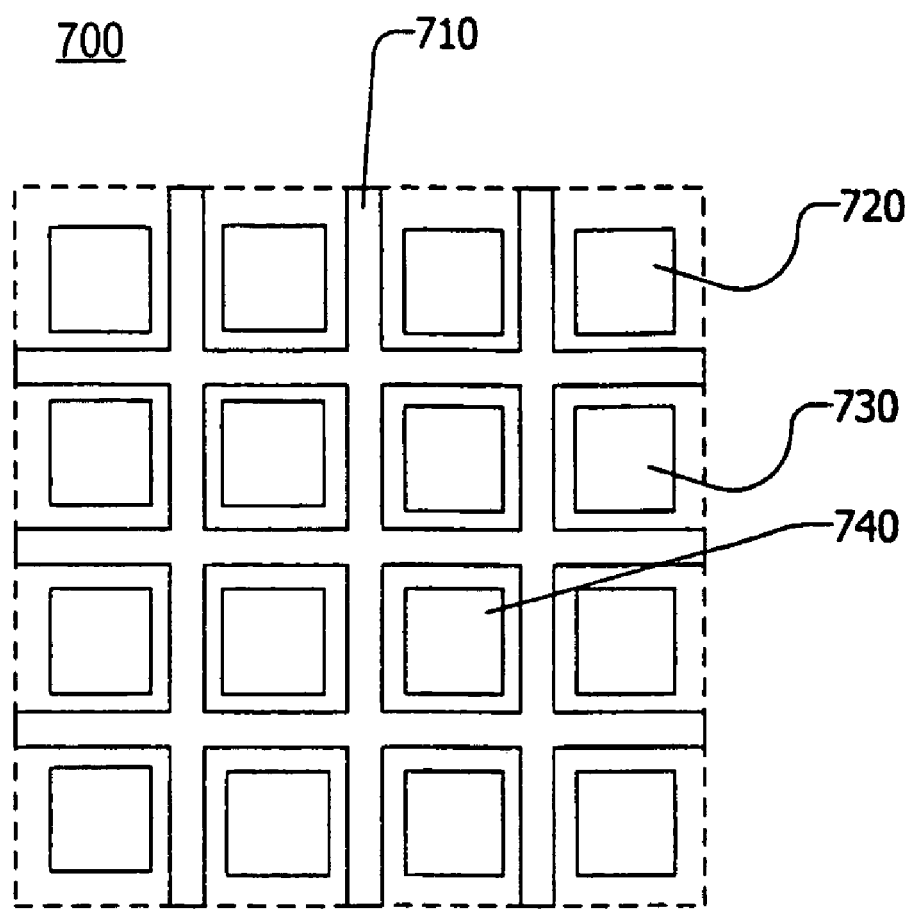
FIG. 7 is a top view of a core having a rectangular design in accordance with the invention.

FIG. 7 shows a diagram of a core 700 having a rectangular design in accordance with the invention. In FIG. 7, the center portion 710 has a grid shape, which can be considered an extension of the plus-shaped center portion 110 of the core 100 of FIGS. 1 and 2. The structure of core 700 may be derived by replicating the core of FIG. 2 three times. The number of primaries and secondaries on the posts determines the number of cells. If each post of core 700 is wound with two primaries and two secondaries, a sixteen cell structure results. But if each post of core 700 is wound with four primaries and four secondaries, then posts 720 on the corners will still share with two neighbors, but posts 730 on the edges will share with three neighbors and posts 740 on the interior will share with four neighbors—resulting in a 24 cell structure.

The core may have other shapes besides square and circular. The desired number of cells may be used to determine the shape. The shape may be rectangular, hexagonal, trapezoidal, oval, T-shaped, L-shaped and other regular and irregular shapes.

A core in accordance with the invention may be viewed as a combination of typical E-cores. In this way, the E-core may be considered an elementary cell, and a core of the invention may be derived by integrating multiple such cells with a shared center portion. By replicating elementary cells, one can develop higher current modules without compromising performance and power density.

As can be seen, this cellular structure enables the development of novel interleaving schemes to reduce switching ripple in inductor current and output voltage. It also facilitates higher integration for multiple output power supplies with integrated magnetics. The invention is applicable to both symmetrical and asymmetrical control schemes.

Figure 8:
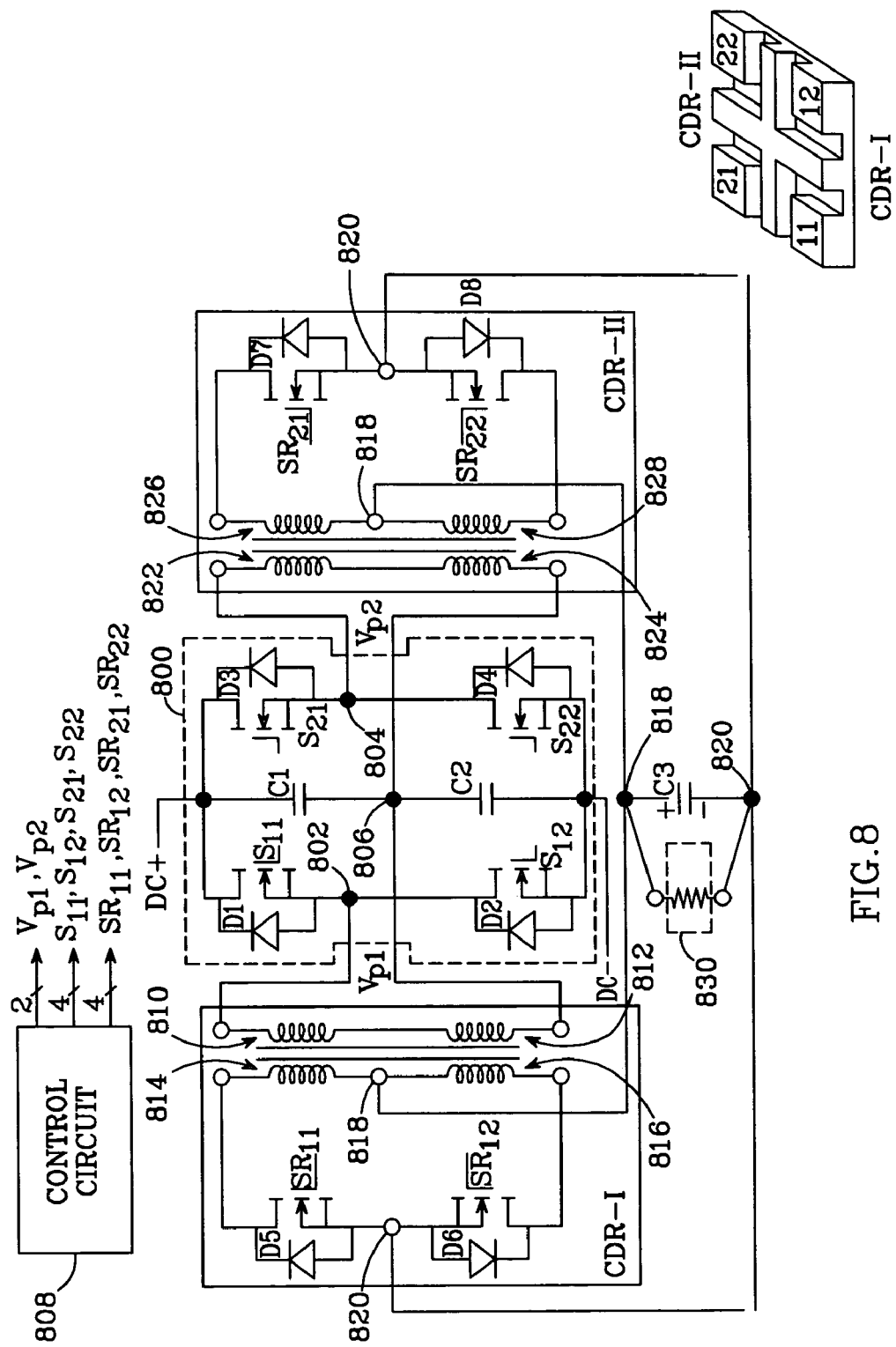
FIG. 8 is a schematic diagram of a DC-DC converter topology in accordance with the invention.

A power converter topology with reduces output voltage ripple is shown in FIG. 8. At least two CDRs are preferably wound on a common core—preferably on the novel core described above and shown at the bottom of FIG. 8—but could also be implemented, for example, on respective E-cores. The converter shown in FIG. 8 is a DC-DC converter which includes two interleaved half-bridge, isolated CDRS, though the concept is extendible to converters made from more or less than two CDRs.

The converter is operated by applying AC drive voltages to respective primary windings. The drive voltages could be generated independently and applied to the primary windings, such that the present converter operates as an AC-DC converter. More typically, however, the present converter would be employed as a DC-DC converter, in which case the AC drive voltages are produced with a DC-AC converter such as DC-AC converter 800 shown in FIG. 8. A DC input voltage is connected across a first series-connected pair of switches $S_{11}$ and $S_{12}$, and across a second series-connected pair of switches $S_{21}$ and $S_{22}$. Switches $S_{11}$ and $S_{12}$ are connected together at a node 802, and switches $S_{21}$ and $S_{22}$ are connected together at a node 804. Switches $S_{11}$, $S_{12}$, $S_{21}$ and $S_{22}$ are preferably FETs, each of which has a parasitic diode (D1, D2, D3, D4) connected across it. The DC input voltage is also connected across a pair of capacitors C1 and C2, which are connected together at a common node 806. Switches $S_{11}$, $S_{12}$, $S_{21}$ and $S_{22}$ are operated with a control circuit 808 to generate a first drive voltage $V_{p1}$ between nodes 802 and 806, and a second drive voltage $V_{p2}$ between nodes 804 and 806.

The first CDR, "CDR-I", comprises two series-connected primary windings 810 and 812, which are connected across nodes 802 and 806 and thus are driven with first drive voltage $V_{p1}$. A pair of secondary windings 814 and 816 are connected together at an output node 818, and are magnetically coupled to primary windings 810 and 812, respectively. A pair of series-connected switches $SR_{11}$ and $SR_{12}$ are connected in parallel with secondary windings 814 and 816, respectively; switches $SR_{11}$ and $SR_{12}$ are connected together at a common node 820.

Similarly, the second CDR, "CDR-II", comprises two series-connected primary windings 822 and 824, which are connected across nodes 804 and 806 and thus are driven with second drive voltage $V_{p2}$. A pair of secondary windings 826 and 828 are connected together at output node 818, and are magnetically coupled to primary windings 822 and 824, respectively. A pair of series-connected switches $SR_{21}$ and $SR_{22}$ are connected in parallel with secondary windings 826 and 828, respectively; switches $SR_{21}$ and $SR_{22}$ are connected together at common node 820.

Switches $SR_{11}$, $SR_{12}$, $SR_{21}$ and $SR_{22}$ are preferably FETs, each of which has a respective parasitic diode (D5, D6, D7 and D8) connected across it as shown in FIG. 8; alternatively, $SR_{11}$, $SR_{12}$, $SR_{21}$ and $SR_{22}$ could be implemented with just diodes oriented in the same way as D5, D6, D7 and D8. A filter capacitor C3 is connected between output node 818 and common node 820. A load 830 would also be connected between output node 818 and common node 820.

If wound on the novel core shown at the bottom of FIG. 8, each primary and secondary pair would be wound on a respective one of the outer posts. For example, windings 810 and 814 would be on the outer post labeled "11", windings 812 and 816 would be on the outer post labeled "12", windings 822 and 826 would be on the outer post labeled "21", and windings 824 and 828 would be on the outer post labeled "22". If wound on two E-cores, windings 810/814 and 812/816 would be on respective outer posts of one of the E-cores, and windings 822/826 and 824/828 would be on respective outer posts of the other E-core.

The AC drive voltages are generated in accordance with the symmetric modulation scheme. In accordance with the present invention, the drive voltages applied to respective CDRs are phase-shifted with respect to each other, by $T_s/(2*N)$, where $T_s$ is the drive voltages' switching period and N is the number of CDRs. For the converter shown in FIG. 8, with N=2, control circuit 808 operates switches $S_{11}$, $S_{12}$, $S_{21}$ and $S_{22}$ such that the drive voltages $V_{p1}$ and $V_{p2}$ are phase-shifted by one-fourth the switching period $T_s$, which ensures that the rectified output currents of the two CDRs are interleaved. Control circuit 808 also provides the signals needed to operate converter switches $SR_{11}$, $SR_{12}$, $SR_{21}$ and $SR_{22}$.

The operational stages of the exemplary DC-DC converter shown in FIG. 8 are illustrated in FIGS. 9–13. A timing diagram for drive voltages $V_{p1}$ and $V_{p2}$ is shown at the top of each of these figures. A timing diagram is shown in FIG. 14 which depicts drive voltages $V_{p1}$ and $V_{p2}$, the currents conducted to load 830 via switches $SR_{11}$, $SR_{12}$, $SR_{21}$ and $SR_{22}$ ($i_{SR11}$, $i_{SR12}$, $i_{SR21}$ and $i_{SR22}$, respectively), the ripple component for the total current provided to the load ($i_{total}$), and the output voltage ripple ($V_o$) (DC component not shown), for one switching period $T_s$.

The timing diagrams illustrate how the AC drive voltages are phase-shifted by one-fourth the switching period $T_s$. The width of each pulse is determined by the converter's duty cycle D(=the percentage of time that the current in any given winding is increasing), and is given by $D*T_s$. When N=2 as in this example, there are four distinct "power transfer" periods in each switching period. The power transfer periods are denoted as $PT_{11}$, $PT_{12}$, $PT_{21}$ and $PT_{22}$, and the switches which are closed by control circuit 808 during each power transfer period are listed on the appropriate timing diagram. When a switch is closed, it is shown on the schematic as a solid, bold line. Direction of current flow is indicated with arrows. When arranged as shown in FIGS. 8–13, the operation of the following pairs of switches is complementary—i.e., when one is on, the other is off: $SR_{11}$ and $S_{12}$, $SR_{12}$ and $S_{11}$, $SR_{21}$ and $S_{22}$, $SR_{22}$ and $S_{21}$. The converter is arranged such that $SR_{11}$ conducts when the voltage across $SR_{12}$ is positive with respect to common node 820 and $V_{p1}$ is positive, and $SR_{12}$ conducts when the voltage across $SR_{11}$ is positive with respect to common node 820 and $V_{p1}$ is negative. Similarly, $SR_{21}$ conducts when the voltage across $SR_{22}$ is positive with respect to common node 820 and $V_{p2}$ is positive, and $SR_{22}$ conducts when the voltage across $SR_{21}$ is positive with respect to common node 820 and $V_{p2}$ is negative.

Figure 9:
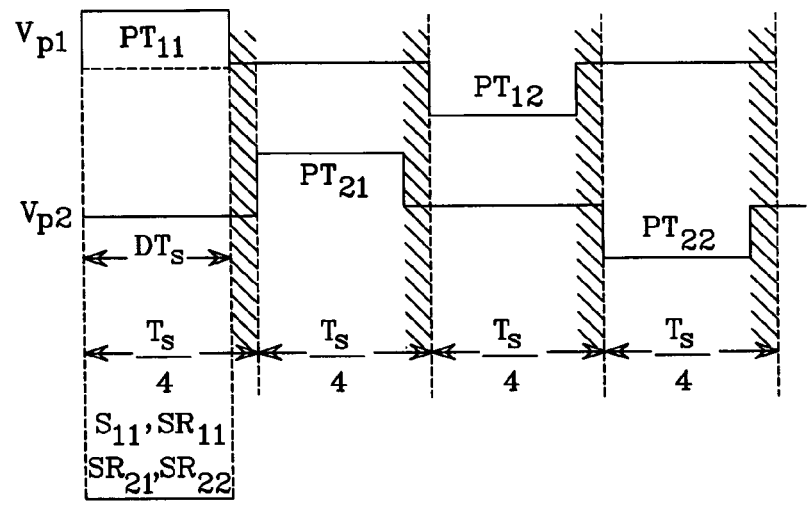
FIG. 9 is a schematic and timing diagram illustrating the operation of the present DC-DC converter during a first power transfer stage.
Figure 9:
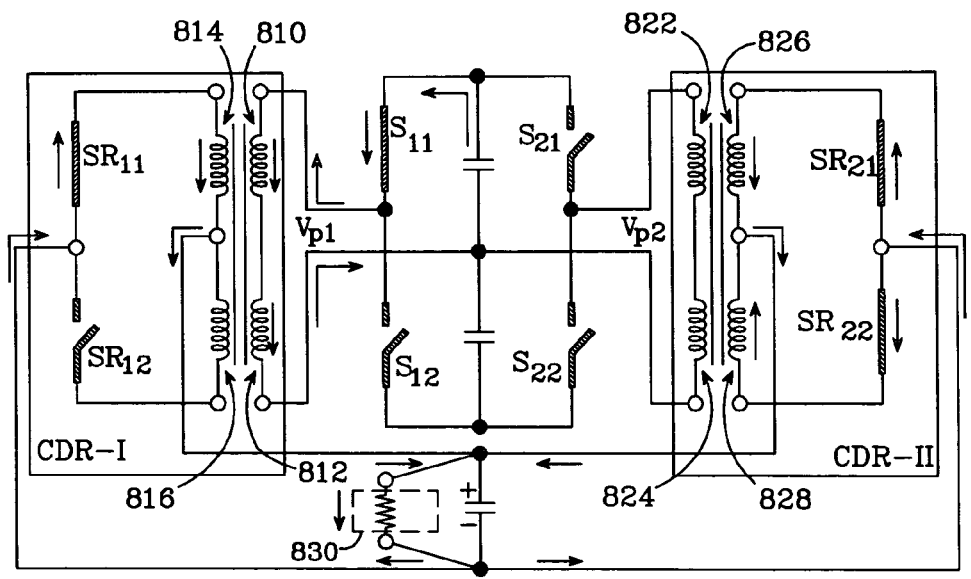

FIG. 9 illustrates the $PT_{11}$ stage of operation, when $V_{p1}$ is positive and $V_{p2}$ is zero. Switches $S_{11}$, $SR_{11}$, $SR_{21}$ and $SR_{22}$ are closed. When so arranged, $V_{p1}$ is applied across the primary windings 810, 812 of CDR-I and power is transferred from the primary to the secondary of CDR-I. Switch $SR_{11}$ carries the reflected primary current from winding 810. This current includes the freewheeling current due to the decaying flux in the outer post with windings 810 and 814, and the charging current that causes the flux to rise in the outer post with windings 816 and 812. No current flows through secondary winding 816 as $SR_{12}$ is off. Since both $S_{21}$ and $S_{22}$ are off, no voltage is applied across the primary windings 822, 824 of CDR-II, and thus the secondary currents of CDR-II freewheel through $SR_{21}$ and $SR_{22}$.

Figure 10:
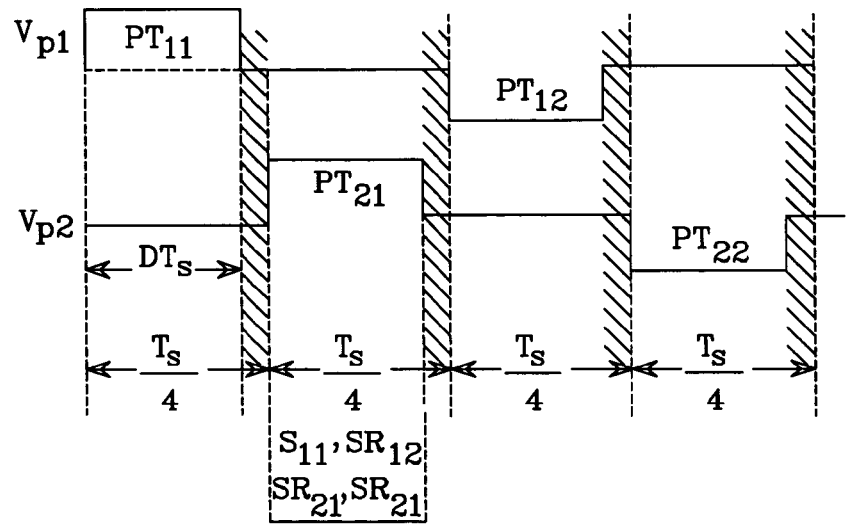
FIG. 10 is a schematic and timing diagram illustrating the operation of the present DC-DC converter during a second power transfer stage.
Figure 10:
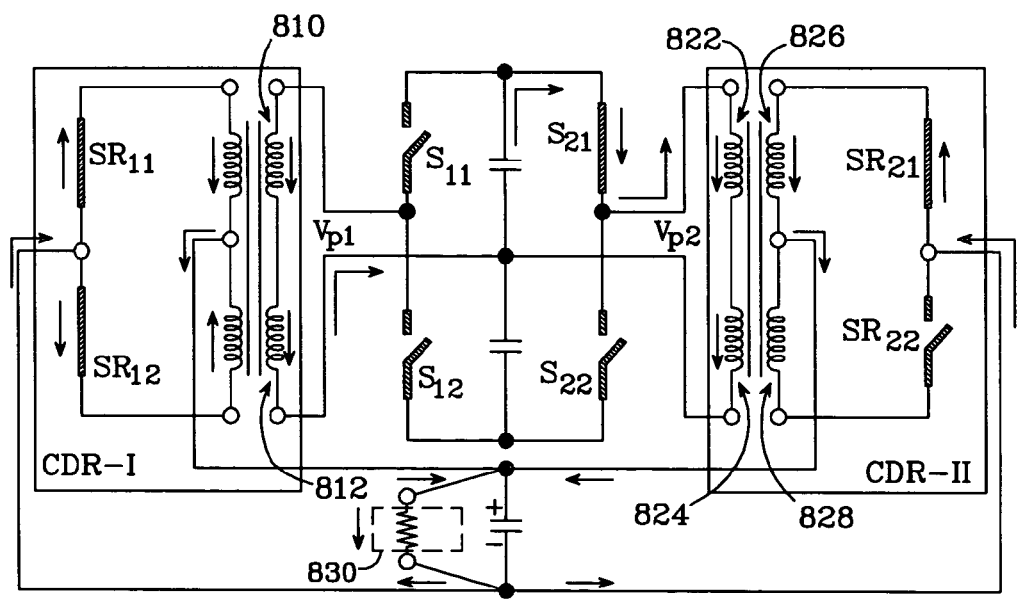

FIG. 10 shows the $PT_{21}$ stage of operation, when $V_{p2}$ is positive and $V_{p1}$ is zero. Switches $S_{21}$, $SR_{11}$, $SR_{12}$ and $SR_{21}$ are closed. When so arranged, $V_{p2}$ is applied across the primary windings 822, 824 of CDR-II and power is transferred from the primary to the secondary of CDR-II. Switch $SR_{21}$ carries the reflected primary current from winding 822. This current includes the freewheeling current due to the decaying flux in the outer post with windings 822 and 826, and the charging current that causes the flux to rise in the outer post with windings 824 and 828. No current flows through secondary winding 828 as $SR_{22}$ is off. Since both $S_{11}$ and $S_{12}$ are off, no voltage is applied across the primary windings 810, 812 of CDR-I, and thus the secondary currents of CDR-II freewheel through $SR_{11}$ and $SR_{12}$.

Figure 11:
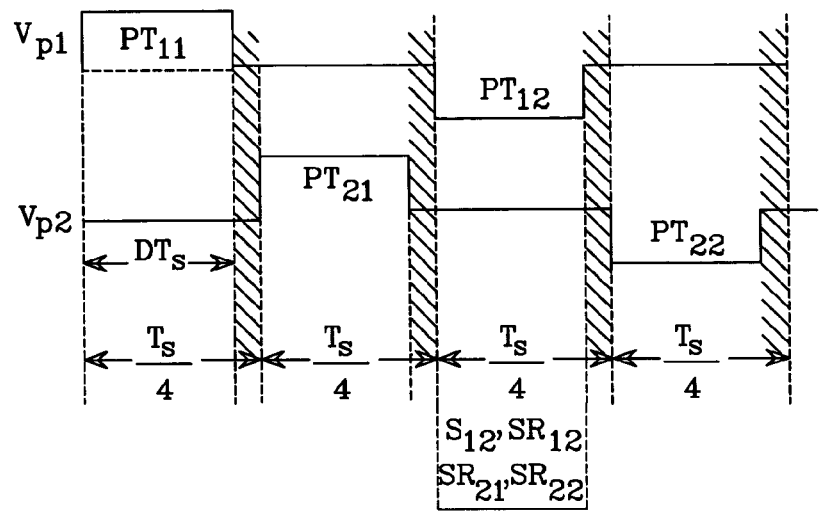
FIG. 11 is a schematic and timing diagram illustrating the operation of the present DC-DC converter during a third power transfer stage.
Figure 11:
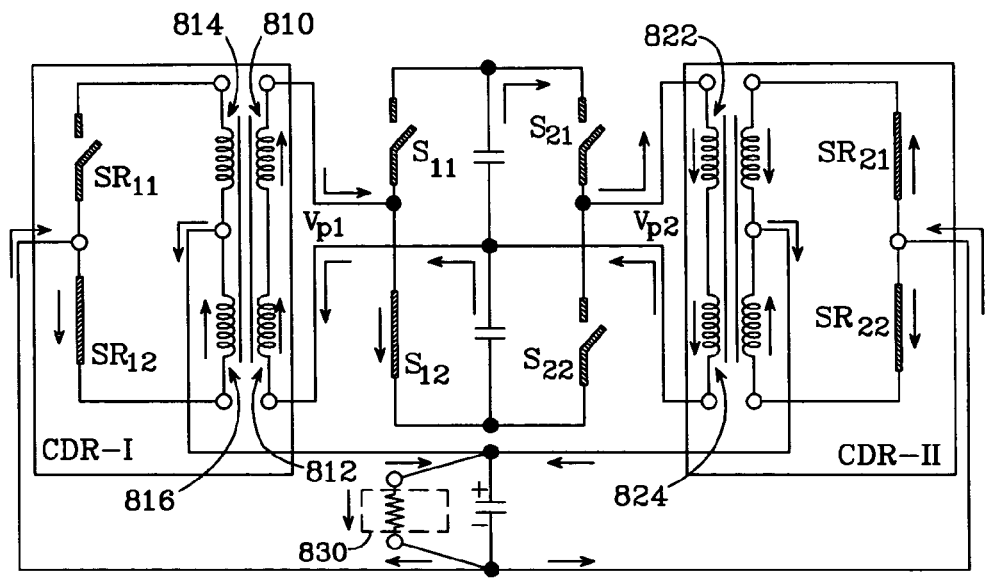

FIG. 11 shows the $PT_{12}$ stage of operation, when $V_{p1}$ is negative and $V_{p2}$ is zero. Switches $S_{12}$, $SR_{12}$, $SR_{21}$ and $SR_{22}$ are closed. When so arranged, $-V_{p1}$ is applied across the primary windings 810, 812 of CDR-I and power is transferred from the primary to the secondary of CDR-I. Switch $SR_{12}$ carries the reflected primary current from winding 812. This current includes the freewheeling current due to the decaying flux in the outer post with windings 812 and 816, and the charging current that causes the flux to rise in the outer post with windings 810 and 814. No current flows through secondary winding 814 as $SR_{11}$ is off. Since both $S_{21}$ and $S_{22}$ are off, no voltage is applied across the primary windings 822, 824 of CDR-II, and thus the secondary currents of CDR-II freewheel through $SR_{21}$ and $SR_{22}$.

Figure 12:
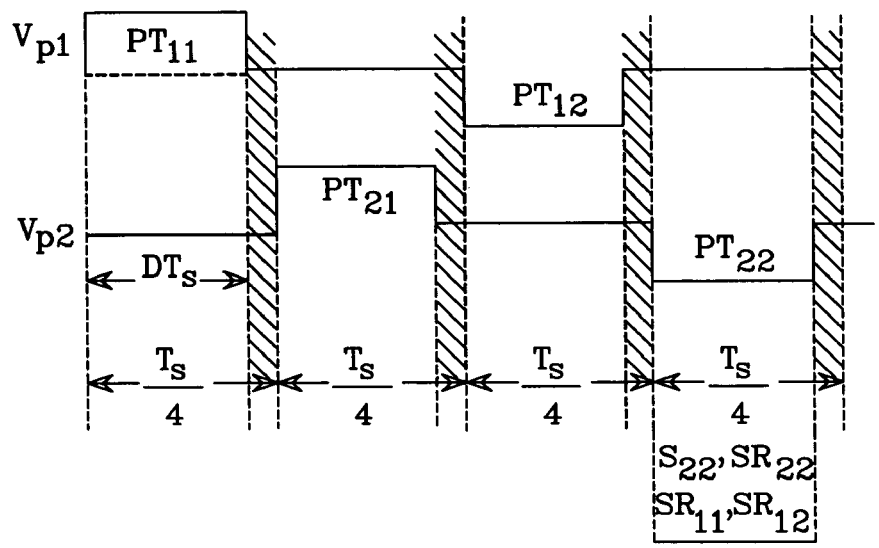
FIG. 12 is a schematic and timing diagram illustrating the operation of the present DC-DC converter during a fourth power transfer stage.
Figure 12:
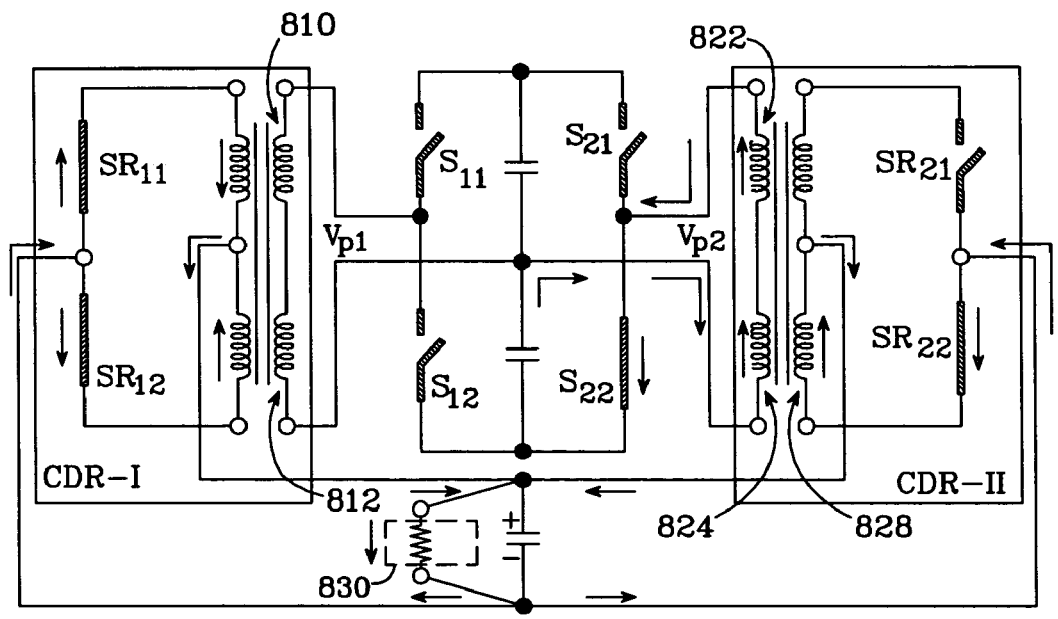

FIG. 12 shows the $PT_{22}$ stage of operation, when $Vp_2$ is negative and $V_{p1}$ is zero. Switches $S_{22}$, $SR_{11}$, $SR_{12}$ and $SR_{22}$ are closed. When so arranged, $-Vp_2$ is applied across the primary windings 822, 824 of CDR-II and power is transferred from the primary to the secondary of CDR-II. Switch $SR_{22}$ carries the reflected primary current from winding 824. This current includes the freewheeling current due to the decaying flux in the outer post with windings 824 and 828, and the charging current that causes the flux to rise in the outer post with windings 822 and 826. No current flows through secondary winding 826 as $SR_{21}$ is off. Since both $S_{11}$ and $S_{12}$ are off, no voltage is applied across the primary windings 810, 812 of CDR-I, and thus the secondary currents of CDR-I freewheel through $SR_{11}$ and $SR_{12}$.

Figure 13:
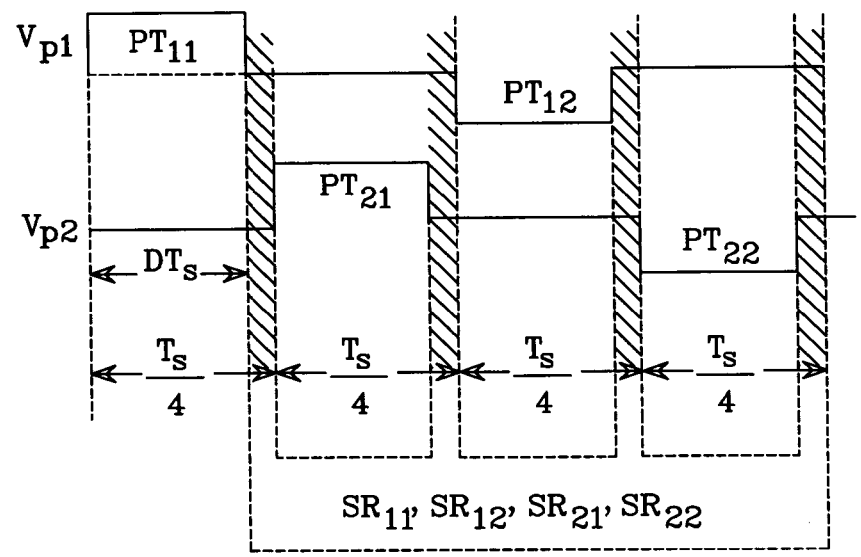
FIG. 13 is a schematic and timing diagram illustrating the operation of the present DC-DC converter during a free-wheeling period.
Figure 13:
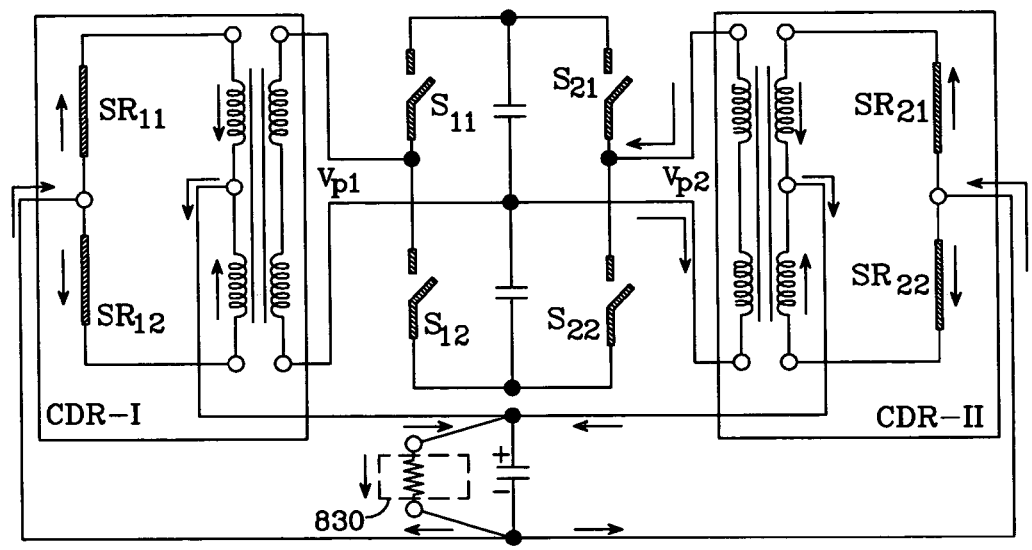
Figure 14:
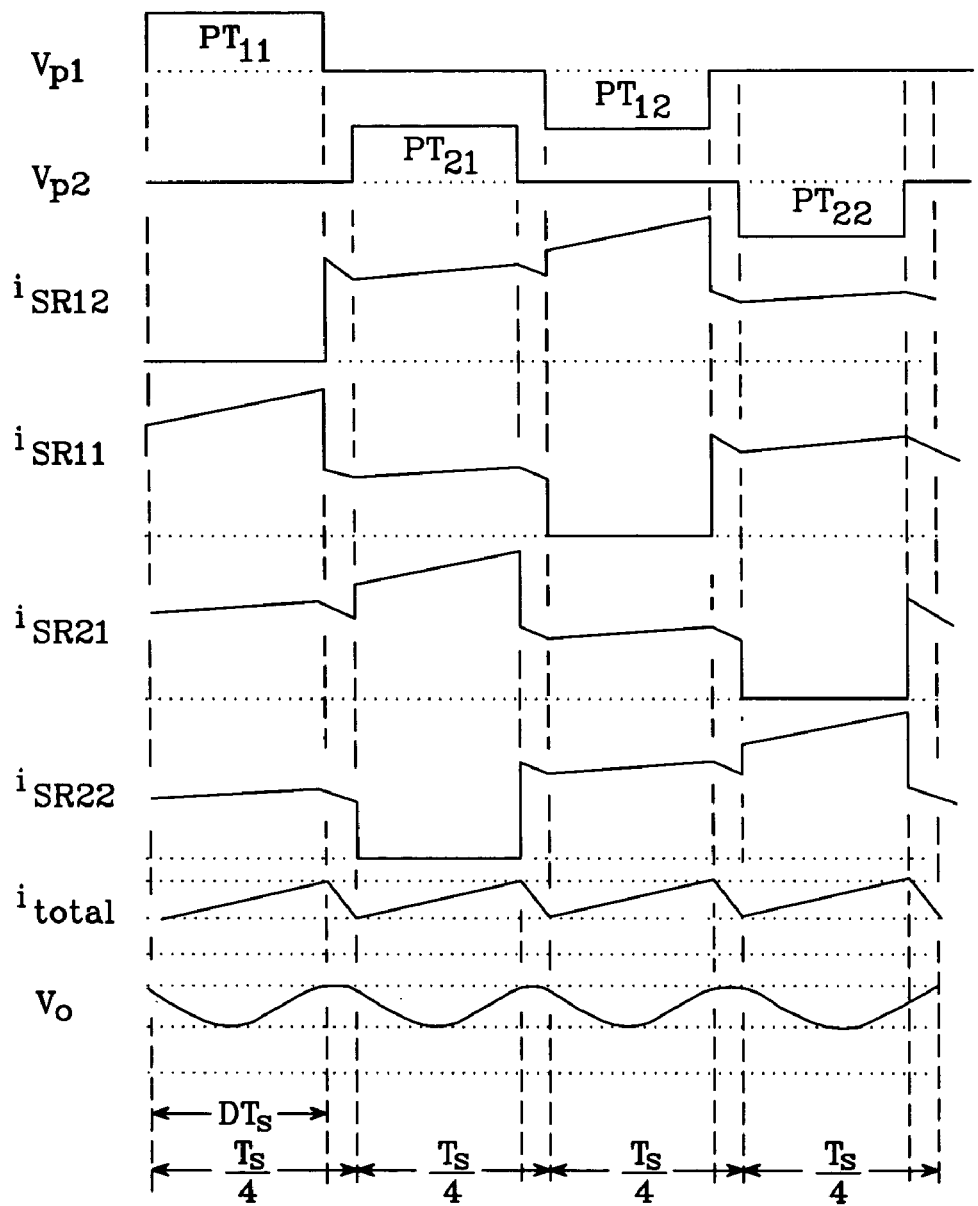
FIG. 14 is a timing diagram illustrating the operation of the present DC-DC converter for one switching period.

FIG. 13 depicts the operation of the converter if both drive voltages are zero. Here, no power is transferred from the primary windings to the secondary windings, as all of the DC-AC converter switches ($S_{11}$, $S_{12}$, $S_{21}$ and $S_{22}$) are open. However, switches $SR_{11}$, $SR_{12}$, $SR_{21}$ and $SR_{22}$ are closed, allowing the secondary currents of CDR-I to freewheel through $SR_{11}$ and $SR_{12}$, and the secondary currents of CDR-II to freewheel through $SR_{21}$ and $SR_{22}$. Note that this "freewheeling" stage occurs between every power transfer stage if and only if $D*T_s<T_s/4$.

Note that it is not essential that $D*T_s$ be less than $T_s/4$. If $D*T_s>T_s/4$, the $V_{p1}$ and $V_{p2}$ waveforms and the power transfer periods will overlap, and there will be no period during which all the secondary currents are freewheeling.

Referring to FIG. 14, it can be seen that the interleaved currents produced with a DC-DC converter as described above results in reduced output current and output voltage ripple when compared with a single CDR configuration, making the present design well-suited to low voltage, high current DC-DC converter applications such as personal computer power supply. In addition, when compared with prior art designs, the present converter enables the size, cost, RMS loss and capacitance of the converter's filter capacitor to be smaller for a given ripple requirement.

As noted above, the present DC-DC converter topology is preferably implemented on the novel core structure described above. However, the invention is not limited to use with such a core structure. For example, the first and second CDRs could be implemented on separate E-cores.

The integration of two CDRs on the novel core structure described above results in magnetic coupling between the outer posts of the core. However, the magnetic coupling does not affect the interleaving of the currents from the two CDRs. The symmetric voltages applied to the primary windings of the two CDRs define the variation of the fluxes in the outer legs of the core structure. Since the primary voltages are phase-shifted from each other by a fixed fraction of the switching time period, the outer post fluxes (equal to the integral of the voltage) are also phase-shifted and interleave as they enter the center leg. The currents flowing through the windings are determined by the fluxes and the reluctance matrix of the core structure. Due to the symmetry of the core structure, the secondary currents add up to the same sum as would be obtained when four triangular, phase-shifted currents are interleaved, even though their individual waveshapes are not triangular.

The DC-AC converter 800 shown in FIGS. 8–13 is merely exemplary. It is only required that AC drive voltages as described herein be applied to at least two interleaved half-bridge, isolated CDRs.

It is also not essential that switches $SR_{11}$, $SR_{12}$, $SR_{21}$ and $SR_{22}$ be implemented with respective FET/diode circuits as shown in FIGS. 8–13. For example, each of these circuits could be replaced with respective diodes, oriented to conduct current from common node 820 to its secondary winding when forward-biased, and to block the flow of current between the secondary winding and common node 820 otherwise. For low output voltages, MOSFETs should be used instead of diodes, in order to prevent loss of output voltage due to the diodes' high forward voltage drop. The diodes' high forward voltage drop also reduces efficiency due to large secondary currents.

Figure 15:
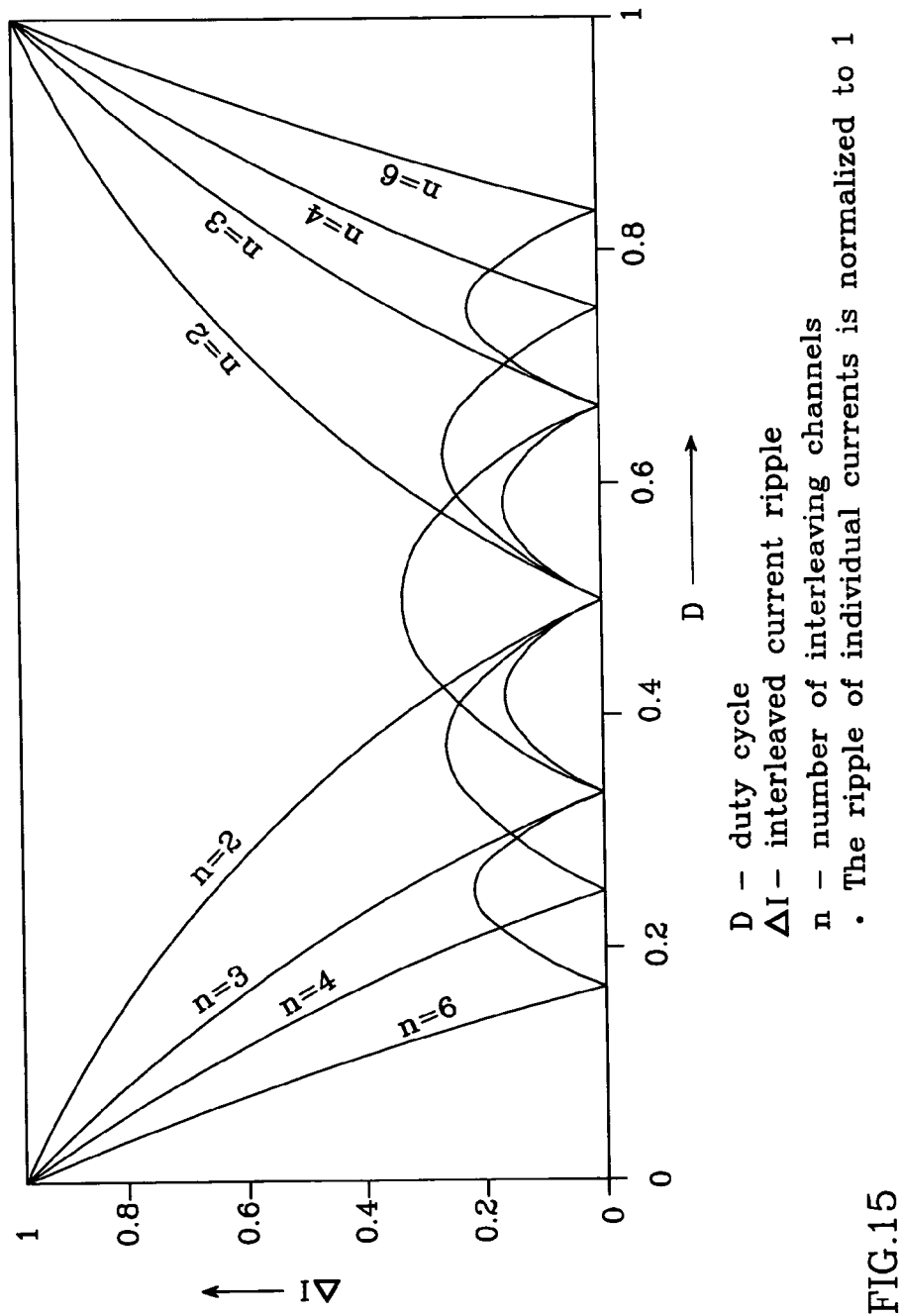
FIG. 15 is a graph plotting current ripple vs. duty cycle for various numbers of interleaved currents.

The invention is not limited to use with two CDRs which generate four interleaved currents. The concept can be easily adapted to converters which generate more or less than four interleaved currents, by, for example, reducing the number of cells to two, or increasing the number of cells to more than four. When two interleaved currents are generated, there is one duty cycle value (D=0.5) for which the lowest possible interleaved current ripple will be realized. Similarly, when four interleaved currents are generated, there are three such duty cycle values. This is illustrated for various values of N in the graph shown in FIG. 15.

While particular embodiments of the invention have been shown and described, numerous variations and alternate embodiments will occur to those skilled in the art. Accordingly, it is intended that the invention be limited only in terms of the appended claims.

We claim:

1. An AC-DC converter, comprising:
   at least two half-bridge current doubler rectifiers (CDRs), each of which is driven with a respective AC drive voltage and is arranged to provide two rectified output currents to an output node, said AC drive voltages having a switching period $T_s$,
   a filter capacitor connected between said output node and a common node coupled to an output of said converter, and
   a load connected between said output node and said common node,
   said AC drive voltages arranged such that they are phase-shifted by $T_s/(2*N)$ such that the rectified output currents of said at least two CDRs are interleaved, wherein N represents a number of said CDRs.

2. The AC-DC converter of claim 1, wherein each of said CDRs comprises:
   first and second primary windings connected in series,
   first and second secondary windings connected together at said output node, said first and second secondary windings magnetically coupled to said first and second primary windings, respectively, said first and second primary windings and first and second secondary windings wound on a common core,
   a first switch circuit connected between said common node and the end of said first secondary winding opposite said output node, and
   a second switch circuit connected between said common node and the end of said second secondary winding opposite said output node,
   said first switch circuit arranged to conduct current only when the voltage across said second switch circuit is positive with respect to said common node and said second switch circuit arranged to conduct current only when the voltage across said first switch circuit is positive with respect to said common node,
   said AC drive voltage applied across said series-connected first and second primary windings.

3. The AC-DC converter of claim 2, wherein the primary and secondary windings of each of said at least two CDRs are wound on a common core.

4. The AC-DC converter of claim 3, wherein said common core comprises:
   a base having an outer edge and a top region,
   a first post disposed on the top region of the base at the outer edge,
   a second post disposed on the top region of the base at the outer edge,
   a third post disposed on the top region of the base at the outer edge,
   a fourth post disposed on the top region of the base at the outer edge,
   a shared common center portion disposed on the base, and
   a top disposed on the posts and opposite the base,
   wherein the first post and the center portion are separated on the base to thereby define a first window, the second post and the center portion are separated on the base to thereby define a second window, the third post and the center portion are separated on the base to thereby define a third window, the fourth post and the center portion are separated on the base to thereby define a fourth window, and the top and center portions are spaced apart to thereby define an air gap.

5. The AC-DC converter of claim 4, wherein said converter comprises first and second CDRs,
   the first primary winding and the first secondary winding of said first CDR wound on said first post,
   the second primary winding and the second secondary winding of said first CDR wound on said second post,
   the first primary winding and the first secondary winding of said second CDR wound on said third post, and
   the second primary winding and the second secondary winding of said second CDR wound on said fourth post.

6. The AC-DC converter of claim 2, wherein said converter comprises first and second CDRs which are wound on first and second E-cores, respectively,
   the first primary winding and the first secondary winding of said first CDR wound on one of the outer posts of said first E-core,
   the second primary winding and the second secondary winding of said first CDR wound on the other of the outer posts of said first E-core,
   the first primary winding and the first secondary winding of said second CDR wound on one of the outer posts of said second E-core, and
   the second primary winding and the second secondary winding of said second CDR wound on the other of the outer posts of said second E-core.

7. A DC-DC converter, comprising:
   a DC-AC converter which converts a DC voltage to N AC drive voltages suitable for driving N half-bridge current doubler rectifiers (CDRs) in accordance with the symmetric modulation scheme, said AC drive voltages having a switching period $T_s$,
   an AC-DC converter comprising at least two half-bridge CDRs, each of which is driven with a respective one of said AC drive voltages and is arranged to provide two rectified output currents to an output node,
   a filter capacitor connected between said output node and a common node coupled to an output of said DC-DC converter, and
   a load connected between said output node and said common node,
   said DC-AC converter arranged such that said AC drive voltages are phase-shifted by $T_s/(2*N)$ such that the rectified output currents of said at least two CDRs are interleaved.

8. The DC-DC converter of claim 7, wherein each of said CDRs comprises:
   first and second primary windings connected in series,
   first and second secondary windings connected together at said output node, said first and second secondary windings magnetically coupled to said first and second primary windings, respectively, said first and second primary windings and first and second secondary windings wound on a common core,
a first switch circuit connected between said common node and the end of said first secondary winding opposite said output node, and
a second switch circuit connected between said common node and the end of said second secondary winding opposite said output node,
said first switch circuit arranged to conduct current when the voltage across said second switch circuit is positive with respect to said common node and the AC drive voltage applied across said first and second primary windings is positive, and said second switch circuit arranged to conduct current when the voltage across said first switch circuit is positive with respect to said common node and the AC drive voltage applied across said first and second primary windings is negative,
said AC drive voltage applied across said series-connected first and second primary windings.

9. The DC-DC converter of claim 8, further comprising a control circuit which operates said AC-DC converter, wherein each of said first and second switch circuits are first and second field-effect transistors (FETs), respectively, and said control circuit is arranged to:
turn on said first FET and turn off said second FET when the AC drive voltage applied across said first and second primary windings is positive and the voltage across said second FET is positive with respect to said common node, and to:
turn on said second FET and turn off said first FET when the AC drive voltage applied across said first and second primary windings is negative and the voltage across said first FET is positive with respect to said common node.

10. The DC-DC converter of claim 8, wherein said first and second switch circuits are first and second diodes, respectively.

11. The DC-DC converter of claim 8, wherein the primary and secondary windings of each of said at least two CDRs are wound on a common core.

12. The DC-DC converter of claim 11, wherein said common core comprises:
a base having an outer edge and a top region,
a first post disposed on the top region of the base at the outer edge,
a second post disposed on the top region of the base at the outer edge,
a third post disposed on the top region of the base at the outer edge,
a fourth post disposed on the top region of the base at the outer edge,
a shared common center portion disposed on the base, and
a top disposed on the posts and opposite the base,
wherein the first post and the center portion are separated on the base to thereby define a first window, the second post and the center portion are separated on the base to thereby define a second window, the third post and the center portion are separated on the base to thereby define a third window, the fourth post and the center portion are separated on the base to thereby define a fourth window, and the top and center portions are spaced apart to thereby define an air gap.

13. The DC-DC converter of claim 12, wherein said base has a square shape, the posts are each disposed at respective corners of said square, and said center portion has plural legs in a plus shape.

14. The DC-DC converter of claim 13, wherein said AC-DC converter comprises first and second CDRs,
the first primary winding and the first secondary winding of said first CDR wound on said first post,
the second primary winding and the second secondary winding of said first CDR wound on said second post,
the first primary winding and the first secondary winding of said second CDR wound on said third post, and
the second primary winding and the second secondary winding of said second CDR wound on said fourth post.

15. The DC-DC converter of claim 8, wherein said AC-DC converter comprises first and second CDRs which are wound on first and second E-cores, respectively,
the first primary winding and the first secondary winding of said first CDR wound on one of the outer posts of said first E-core,
the second primary winding and the second secondary winding of said first CDR wound on the other of the outer posts of said first E-core,
the first primary winding and the first secondary winding of said second CDR wound on one of the outer posts of said second E-core, and
the second primary winding and the second secondary winding of said second CDR wound on the other of the outer posts of said second E-core.

16. The DC-DC converter of claim 7, wherein N=2 such that first and second CDRs receive first and second AC drive voltages, respectively, and provide four interleaved rectified currents to said output node in response.

17. The DC-DC converter of claim 16, wherein said DC-AC converter comprises:
positive and negative DC input voltage terminals for receiving a DC input voltage,
first and second switches connected in series between said positive and negative DC input voltage terminals, the junction of said first and second switches being a first node,
third and fourth switches connected in series between said positive and negative DC input voltage terminals, the junction of said third and fourth switches being a second node,
first and second capacitors connected in series between said positive and negative DC input voltage terminals, the junction of said first and second capacitors being a third node,
said first AC drive voltage taken between said first and third nodes and said second AC drive voltage taken between said second and third nodes, and
a control circuit which operates said first, second, third and fourth switches to provide said first and second AC drive voltages such that they are phase-shifted by $T_s/4$ with respect to each other.

18. A DC-DC converter, comprising:
a DC-AC converter which converts a DC voltage to first and second AC drive voltages suitable for driving respective half-bridge current doubler rectifiers (CDRs) in accordance with the symmetric modulation scheme, said AC drive voltages having a switching period $T_s$, said DC-AC converter comprising:
positive and negative DC input voltage terminals for receiving a DC input voltage,
first and second switches connected in series between said positive and negative DC input voltage terminals, the junction of said first and second switches being a first node, third and fourth switches connected in series between said positive and negative DC input voltage terminals, the junction of said third and fourth switches being a second node, first and second capacitors connected in series between said positive and negative DC input voltage terminals, the junction, of said first and second switches being a third node, a first AC drive voltage taken between said first and third nodes and a second AC drive voltage taken between said second and third nodes, and a control circuit which operates said first, second, third and fourth switches to provide said first and second AC drive voltages such that they are phase-shifted by $T_s/4$ with respect to each other, an AC-DC converter comprising first and second half-bridge CDRs, each of which is driven with a respective one of said AC drive voltages such that said CDRs provide four interleaved rectified output currents to an output node, each of said CDRs comprising:

first and second primary windings connected in series, first and second secondary windings connected together at said output node, said first and second secondary windings magnetically coupled to said first and second primary windings, respectively, said first and second primary windings and first and second secondary windings wound on a common core, a first switch circuit connected between a common node coupled to said output of said DC-DC converter and the end of said first secondary winding opposite said output node, and a second switch circuit connected between said common node and the end of said second secondary winding opposite said output node, said first switch circuit arranged to conduct current when the voltage across said second switch circuit is positive with respect to said common node and the AC drive voltage applied across said first and second primary windings is positive, and said second switch circuit arranged to conduct current when the voltage across said first switch circuit is positive with respect to said common node and the AC drive voltage applied across said first and second primary windings is negative, said AC drive voltage applied across said series-connected first and second primary windings, a filter capacitor connected between said output node and a common node, and a load connected between said output node and said common node.

19. The DC-DC converter of claim 18, wherein each of said first and second switch circuits are first and second field-effect transistors (FETs), respectively, and said control circuit is further arranged to:

turn on said first FET and turn off said second FET when the AC drive voltage applied across said first and second primary windings is positive and the voltage across said second FET is positive with respect to said common node, and to:

turn on said second FET and turn off said first FET when the AC drive voltage applied across said first and second primary windings is negative and the voltage across said first FET is positive with respect to said common node.

20. The DC-DC converter of claim 18, wherein the primary and secondary windings of said two CDRs are wound on a common core, said common core comprising:

a base having an outer edge and a top region, a first post disposed on the top region of the base at the outer edge, a second post disposed on the top region of the base at the outer edge, a third post disposed on the top region of the base at the outer edge, a fourth post disposed on the top region of the base at the outer edge, a shared common center portion disposed on the base, and a top disposed on the posts and opposite the base, wherein the first post and the center portion are separated on the base to thereby define a first window, the second post and the center portion are separated on the base to thereby define a second window, the third post and the center portion are separated on the base to thereby define a third window, the fourth post and the center portion are separated on the base to thereby define a fourth window, and the top and center portions are spaced apart to thereby define an air gap, wherein the first primary winding and the first secondary winding of said first CDR are wound on said first post, the second primary winding and the second secondary winding of said first CDR are wound on said second post, the first primary winding and the first secondary winding of said second CDR are wound on said third post, and the second primary winding and the second secondary winding of said second CDR are wound on said fourth post.

21. The DC-DC converter of claim 18, wherein said first and second CDRs are wound on first and second E-cores, respectively, the first primary winding and the first secondary winding of said first CDR wound on one of the outer posts of said first E-core, the second primary winding and the second secondary winding of said first CDR wound on the other of the outer posts of said first E-core, the first primary winding and the first secondary winding of said second CDR wound on one of the outer posts of said second E-core, and the second primary winding and the second secondary winding of said second CDR wound on the other of the outer posts of said second E-core.

* * * * *